United States Patent Office

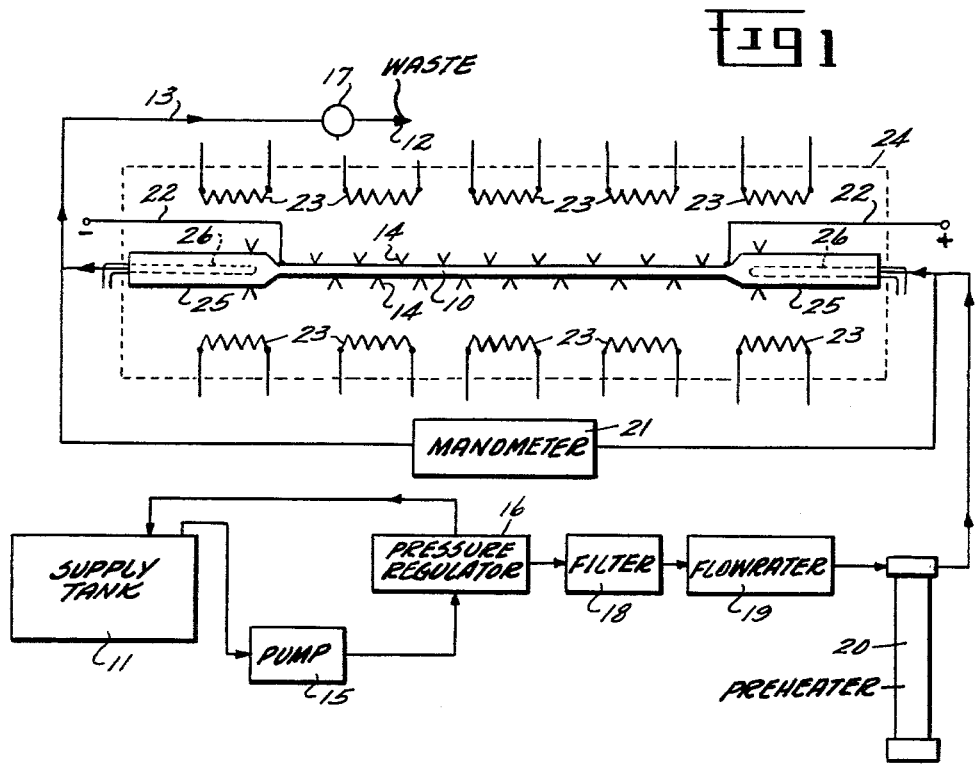
Fig 1
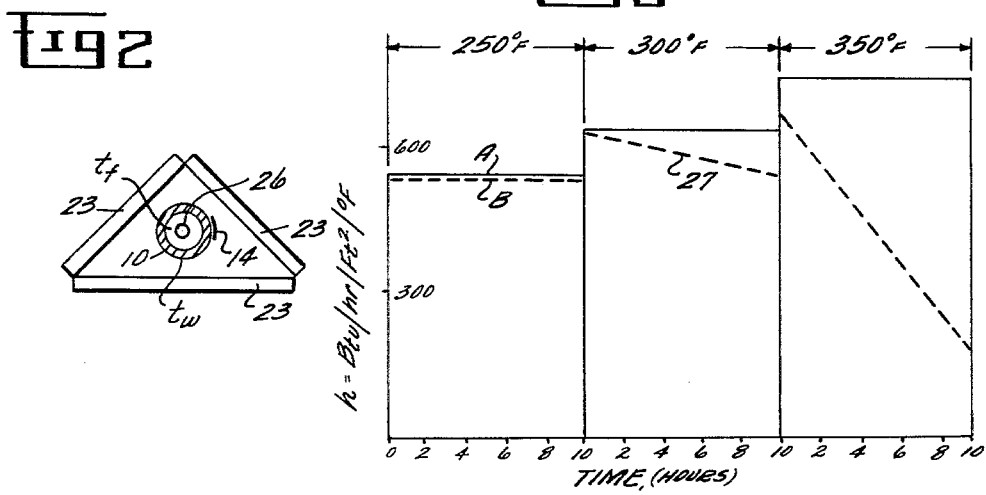
Fig 2
Fig 3
INVENTOR.
MAURICE W. SHAYESON
FREDERICK BURGGRAF
BY
John F. Cullen
ATTORNEY—

3,229,499
Patented Jan. 18, 1966

3,229,499
METHOD AND APPARATUS FOR MEASURING FLUID THERMAL CHARACTERISTICS
Maurice W. Shayeson and Frederick Burggraf, Cincinnati, Ohio, assignors to General Electric Company, a corporation of New York
Filed Dec. 23, 1963, Ser. No. 332,589
9 Claims. (Cl. 73—15)

The present invention is directed to a method and apparatus for measuring fluid thermal characteristics and, more particularly, to a method and apparatus that is primarily directed to measuring fuel thermal stability by measurement of the effects of deposits.

The design of aircraft jet engines suitable for supersonic flight is dependent upon the successful dissipation of heat absorbed by the engine lubricating oil and hydraulic fluid. At supersonic flight, since ram air temperatures approach or exceed the maximum temperature reached by these fluids, air cannot be used as a satisfactory heat sink and it is customary to use the fuel for that purpose.

Hydrocarbon fuels exhibit varying degrees of chemical instability upon heating dependent upon factors not well known in the present state of the art. It is believed that practically all fuels contain traces of impurities in such low concentrations that they have not been identified. Also, all fuel contains dissolved air. Under high temperatures, it is believed that the impurities react with the oxygen in the dissolved air and this results in gums or varnish. These gums can plate out or deposit on the heat transfer surfaces. This is particularly important when the heat transfer coefficients are initially very high—a characteristic of good aircraft design practice. In time, these gum or varnish deposits materially reduce the effectiveness of the heat transfer surface. Physical and chemical tests normally applied to fuels are incapable of predicting the manner or extent to which fuels will form such deposits.

Since the device and method of the instant invention were conceived primarily for the purpose of testing fuels of the type described above, the description herein will be directed to such an application for ease of disclosure. However, it should be recognized that the method and apparatus are not limited to fuels but are applicable to any fluids which might be used as a heat transfer medium and in which the gradual decay of the fluid could adversely affect its heat transfer characteristics. Furthermore, it will be apparent that the method and apparatus may be used to determine the heat capacity of fluids. For purposes of explanation, the invention is described in connection with the measurement of the heat transfer coefficient of fuels.

The prior art has proposed numerous devices for rating fuel deposit forming tendencies. These have generally involved some arbitrary method of measuring fuel quality based on a visual estimate of deposits formed. A typical prior art device passes the fuel over an internally heated aluminum tube and through an annulus formed by another tube spaced around the outside. The fuel is thus run under heated conditions for a period of time at the end of which the inner tube is removed to determine visually how much discoloration the fuel has deposited on the tube. An arbitrary numeral system may be assigned as an indication of a rating of the fuel. For example, if the deposit is yellow it may be rated 2, if the deposit is brown—3, black—4, and so on with gradations in between. By experience, the operator is able to determine the color and assign the number. This then forms a numerical system for rating fuel quality on the basis of a visual estimate of the color formed by the deposit.

The difficulty with this arrangement is that it has not been shown that the color of the deposit has any relation to how the fuel will react in an engine under operating conditions.

The deposits formed from the application of heat obviously do effectively interfere with heat transfer in a heat exchanger. However, there is presently no known way of measuring the effect merely from the color of the deposit. Such an arrangement for determining fuel characteristics may be satisfactory based on a particular engine or a given or known application since the engine may be tested with the fuel and the arbitrary color system assigned to that engine. The result is not particularly meaningful since it merely states that a given temperature rating in that particular fuel may be good enough for that particular engine. It does not rate a fuel by information that is not dependent on the application. In other words, it does not provide a rating for the fuel, for example, like an octane rating, that is applicable to all engines and that results in information that can be applied to a fuel to determine its characteristics and provide information that is useful to all applications.

There is a need for a method and apparatus which will demonstrate and provide data that a fuel which passes a test at a given temperature is suitable for all engines. In other words, a test is desired to give go no-go data and in which fuel that fails the test will fail in an engine and the fuel which passes such test will pass in the engine application.

For such a result, it is necessary that the fuel be tested under engine operating conditions. One of the requirements for a high speed engine application is turbulent flow or high Reynolds number flow. It is generally known that Reynolds number indicates the degree of turbulence and fully turbulent flow occurs at a Reynolds number of about 5000 and above. Laminar flow may occur at 2000 and below and between the two is a generally recognized gray area. Fuel tested at laminar flow and a given temperature may turn a given color but may react entirely differently at the same temperature under turbulent flow. The result is that a given fuel may be entirely satisfactory for a particular condition but, because of the lack of knowledgeable data about the fuel it may be of a much higher and costlier grade than that actually required for a given application if enough were known about the fuel.

The main object of the present invention is to provide a method and apparatus for testing fuel under simulated engine conditions to provide information on the effects of the heat flow resistance of the deposited film or gum.

Another object is to provide an apparatus which provides a continuous reading of the rating of the fuel and in which there is no need to disassemble for a visual color test.

A further object is to provide an apparatus which provides for very high accuracy under repeated conditions of similar operation and one in which accurate heat balances are maintained.

A further object is to provide a method for measuring the heat transfer effect of the gum deposits to provide information that is applicable to all fluids under operating conditions.

Briefly stated, the method of measuring the heat transfer effects of deposits from a flowing heated fluid such as fuel involves the steps of flowing the fluid through a confining member, such as a conduit, of fixed dimensions, applying heat to the fluid through the confining member and maintaining an atmosphere surrounding the member to insure that substantially all the heat applied flows from the confining member into the fluid and no radiation or heat loss occurs, measuring the temperature rise and flow rate of the fluid and measuring the temperature difference between the confining member and the fluid so that the coefficient of heat transfer across the member to the fluid can be determined as a meaningful piece of information that is applicable to the particular fluid being tested and which is meaningful and non-arbitrary for all applications. Additionally, the invention is directed to an apparatus that is specifically designed to perform this method.

While the specification concludes with claims particularly pointing out and distinctly claiming the subject matter which is regarded as the invention, it is believed the invention will be better understood from the following description taken in connection with the accompanying drawing in which:

FIG. 1 is a flow diagram of the apparatus of the instant invention showing the main and a few accessory elements;

FIG. 2 is a partial cross-sectional diagrammatic view to illustrate the guard heater arrangement; and FIG. 3 is a typical plot of the results obtainable by the instant method and apparatus.

Referring first to FIG. 1, a general flow diagram layout for testing of fuel (or any other suitable fluid which tends to break down under temperature) is shown. Essentially, a test section confining member, such as a conduit 10, is provided through which fuel is pumped. Generally, the fluid passes from a source such as supply tank 11 through various accessories, as will later be explained, and then through the test conduit 10. It eventually flows to waste at 12 as shown by the arrows on main flow line 13. In order to maintain the fuel tested at minimum test quantities, the heat exchange element conduit 10 may be very small. A typical conduit is of stainless steel .063 inch O.D. by .008 inch wall thickness and about 16 inches effective length. It can be seen that this provides a very small diameter tube in the neighborhood of .05 inch I.D. In order to obtain the intelligible and valuable information of the instant invention, it is necessary to instrument the test section or conduit 10. To this end, the exterior wall of the conduit is instrumented with thermocouples 14 placed at close intervals along the conduit. The intervals actually used in the example are every inch. While this particular spacing is not necessary it provides for enough readings that an accurate average may be taken in the event that any individual thermocouple is inaccurate. As will later be apparent it is necessary that the cross-technical area of the tube and length be predetermined or fixed. In order to simulate most engine operating conditions, the fuel is forced through the inner bore of the conduit at fully turbulent conditions. In the case of determining the fuel characteristics for engine use this is generally at a Reynolds number above 5000.

Referring next to the accessories leading up to the conduit, fuel is taken from the supply tank by suitable pump means 15 which forces the fuel through the member 10. While not essential, but as a means of simplification, the pressure may preferably be maintained generally constant by means of a pressure regulator 16 operating in conjunction with a downstream orifice 17 resulting in substantially constant fuel flow rate. Pressure regulator 16 may return excess fluid to the tank in a well known manner. Suitable necessary accessories such as filter 18, flowrator 19 and preferably independently controlled preheater 20 may be used to provide additional necessary information. While flowrator 19 may give a fairly accurate estimate of the flow rate, the actual rate is preferably determined by weighing for greater accuracy. A manometer 21 is used to determine the pressure drop across the test section.

Since the information desired of the fuel is its deposited film characteristic under temperature and flow conditions, it is necessary to apply heat to the fuel for the purpose of causing the deposits to be made. To this end, electric power means (not shown) is connected by circuit means 22 to the conduit 10 for heating the conduit by resistance. The power may conventionally be controlled by a variable transformer and measured by a calibrated wattmeter not shown. The significant point in the conduit 10 is heated directly by a measured amount of heat which is preferably kept constant to remove a variable condition that would otherwise be introduced.

Since it is desired to maintain the heat input to the fuel constant through the wall of the conduit 10 it is essential that the conduit be in a controlled atmosphere so that all the heat supplied is directed into the fuel through the walls of the conduit. This atmosphere is preferably provided by guard heaters 23 which substantially enclose the test section and are matched to the temperature of the thermocouples 14. Section 10, could be enclosed by any suitable means forming a thermal barrier, such as insulation 24, so that substantially all of the heat supplied to the test section 10 goes into the fuel. The guard heaters 23 are independently controlled by individual variable transformers not shown so that they may be adjusted to match the conduit temperature to provide the desired atmosphere and inhibit heat losses such as radiation and convection from the conduit. Such an arrangement of a closely controlled atmosphere surrounding the conduit is shown in FIG. 2.

In order to further control the accuracy of the heat supplied, the ends of conduit 10 may be swaged into larger sections 25 containing suitable thermocouples 26 that can directly measure the fuel temperature in the conduit to determine the fuel temperature rise. The guard heaters 23 may practically be divided into groups, such as five, for convenience and independently controlled as previously stated so that the same temperatures can be maintained in the atmosphere surrounding the confining member 10.

While a heating atmosphere surrounding the test section has been shown, it will be apparent that other types of atmosphere may be used. For example, element 24 representing a box or insulation can also represent a box to provide a vacuum around the test section which vacuum would reduce heat loss. Practically speaking, the heated atmosphere is preferred since it is easier to obtain and control. The purpose of the atmosphere is to ensure that substantially all of the heat supplied to the conduit 10 flows from that member inwardly to the fuel to be tested.

Since constant heat is supplied per unit of length and all of the heat applied to the conduit flows into the fuel it will be apparent that there will be a temperature rise across the test section or conduit 10 in the direction of flow or from right to left. For repeatability, when testing different fuels, it may be desired to keep this temperature rise constant although it is not required. Maintaining the rise constant merely ensures that different fuels can be measured under comparable conditions reducing corrections.

It will be apparent that a high degree of accuracy is thus obtained of temperature conditions and that the temperature rise is accurately determined by thermocouples 26 at the ends of the test section. Additionally, flowrator 19 measures the flow rate of the fluid which is more accurately obtained by weighing and further, the temperature difference between the test section or confining member 10 and the fluid is determined by readings between thermocouples 14 and 26.

Reference may now be made to the basic heat flow equation of:

$$h = \frac{Q}{A \Delta T}$$

where $Q$ = the heat absorbed by the fuel in B.t.u.'s/hour
$A$ = the inside surface area of conduit 10 in square feet which equals $\pi d \times$ length
$\Delta T$ = the tube wall temperature $t_w$ minus the fuel temperature $t_f$ in ° F. This is the average temperature at thermocouples 14 minus the average of the temperatures at thermocouples 26.

In the above equation, the value of $h$ which is the heat transfer coefficient across the conduit wall into the fuel may be determined extremely accurately. It will be apparent that this will change as the fuel deposits a film on the inside of the wall from zero up to any predetermined amount of residue as it affects the heat transfer coefficient on the inside wall. This residue will vary depending on the length of time that heat is applied to the fuel as well as the temperature of the fuel through the test section. By determination of the heat transfer at the start of the test with no film and at any desired period during the test as film is deposited it will be apparent that the difference between the two readings represents the effect of the heat flow resistance of the film itself, which, being so small and inaccessible, cannot be measured directly. The difference between these two readings however provides the effect of the resistance of the film. Since the heat transferred goes down as the deposit increases under the application of heat it is possible to plot the heat transfer versus the time at different temperature levels as shown in FIG. 3.

In this figure, as an example, a particular fuel A shown as a solid line, shows no change in heat transfer coefficient with the passage of time at three selected temperature levels. The step form shown is caused by the fact that the heat transfer coefficient changes because other fuel properties change under different temperature conditions. Another fuel B, shown as a dotted line does show a change in heat transfer coefficient with the passage of time. This appears as a droop 27 at fuel outlet temperatures of 300° F. and above. If the droop causes a loss after a predetermined number of hours for an application such that engine components would be adversely affected, then such a fuel is unsatisfactory for that application.

Thus, it will be seen that the method and apparatus provides a constant reading without the necessity of disassembly as well as avoiding reliance on an arbitrary visual or color determination. The method is exact providing effects of heat flow resistance of deposited film which is a direct measure of a critical fuel characteristic under the application of heat. As such, the information may be applied to any engine or for that matter, to any heat exchanger applications wherein the prolonged application of heat tends to deposit impurities and reduce heat exchanger effectiveness. It should be further noted that it is not even necessary to determine the heat transfer of the deposited film since it is only the difference of the heat transfer across the conduit wall at the beginning when there is no film or zero film to some period of time when a predetermined amount has formed. Since the difference gives the loss of heat transfer effectiveness, this may be plotted to provide the required information as shown in FIG. 3.

While there has been described a preferred form of the invention, obvious modifications and variations are possible in light of the above teachings. It is therefore to be understood that within the scope of the appended claims the invention may be practiced otherwise than as specifically described.

We claim:
1. In a method of measuring the heat transfer effects of deposits from a flowing heated fluid, the steps of,
   flowing the fluid through a confining member of fixed dimensions,
   applying heat to the fluid through the confining member,
   maintaining an atmosphere surrounding the confining member to ensure that substantially all the heat flows from the confining member to the fluid,
   measuring the temperature rise and flow rate of the fluid, and
   measuring the temperature difference between the confining member and fluid whereby the coefficient of heat transfer across the confining member to the fluid may be determined.
2. A method as described in claim 1 using fuel as the fluid which is flowed through the confining member,
   flowing said fuel in a fully turbulent state, and
   applying constant heat to the fuel through the confining member to deposit from zero up to a predetermined amount of residue on the member.
3. A method as described in claim 1 wherein the atmosphere is maintained at the same temperature as the confining member.
4. A method as described in claim 2 wherein the atmosphere is maintained at the same temperature as the confining member.
5. A fluid tester comprising,
   a source of fluid to be tested,
   a conduit of predetermined cross-sectional area and length connected thereto,
   means to force said fluid to flow through the conduit,
   means connected to said conduit to provide constant measured heat through the conduit to said fluid,
   temperature sensing means for measuring the temperature rise of the fluid,
   means to measure the flow rate of the fluid, and
   second temperature sensing means spaced along said conduit.
6. Apparatus as described in claim 5 wherein said second temperature sensing means comprises thermocouples independent of said first temperature sensing means for determining the temperature difference between the confining member and fluid whereby the coefficient of heat transfer across the confining member to the fluid may be determined.
7. Apparatus as described in claim 5 wherein the fluid flowed is fuel in fully turbulent flow, and
   the conduit is surrounded by independently controlled heating means matching said conduit heating means to provide an atmosphere inhibiting heat loss from said conduit.
8. Apparatus as described in claim 7 having preheating means in the connection between said source and conduit,
   said preheating means being independently controlled.
9. Apparatus as described in claim 7 having means in the connection between said source and said conduit and means downstream of said conduit for maintaining constant flow in said conduit.

References Cited by the Examiner
UNITED STATES PATENTS

| | | | |
|---|---|---|---|
| 2,669,865 | 2/1954 | Cole et al. | 73—64 |
| 2,813,237 | 11/1957 | Fluegel et al. | 73—204 |
| 3,059,467 | 10/1962 | Meguerian et al. | 73—15 |
| 3,108,468 | 10/1963 | Mickel | 73—61 |

RICHARD C. QUEISSER, *Primary Examiner.*

J. C. GOLDSTEIN, *Assistant Examiner.*